United States Patent
Hong et al.

(10) Patent No.: US 12,289,765 B2
(45) Date of Patent: Apr. 29, 2025

(54) ACCESS FEEDBACK METHOD, BASE STATION, TERMINAL, AND STORAGE MEDIUM

(71) Applicants: BEIJING XIAOMI MOBILE SOFTWARE CO., LTD., Beijing (CN); BEIJING UNIVERSITY OF POSTS AND TELECOMMUNICATIONS, Beijing (CN)

(72) Inventors: Wei Hong, Beijing (CN); Yajun Zhu, Beijing (CN); Tong Sha, Beijing (CN); Yong Li, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 684 days.

(21) Appl. No.: 17/422,431

(22) PCT Filed: Jan. 18, 2019

(86) PCT No.: PCT/CN2019/072429
§ 371 (c)(1),
(2) Date: Jul. 12, 2021

(87) PCT Pub. No.: WO2020/147129
PCT Pub. Date: Jul. 23, 2020

(65) Prior Publication Data
US 2022/0078850 A1    Mar. 10, 2022

(51) Int. Cl.
*H04W 74/0833* (2024.01)
*H04W 72/20* (2023.01)
*H04W 74/0808* (2024.01)

(52) U.S. Cl.
CPC ....... *H04W 74/0833* (2013.01); *H04W 72/20* (2023.01); *H04W 74/0808* (2013.01)

(58) Field of Classification Search
None
See application file for complete search history.

(56) References Cited

U.S. PATENT DOCUMENTS

| | | | |
|---|---|---|---|
| 2016/0050667 A1 | 2/2016 | Papasakellariou et al. |
| 2018/0241511 A1 | 8/2018 | Harada et al. |

(Continued)

FOREIGN PATENT DOCUMENTS

| | | | |
|---|---|---|---|
| CN | 108476532 A | 8/2018 |
| CN | 108781463 A | 11/2018 |
| WO | 2016153548 A1 | 9/2016 |
| WO | 2017136458 A2 | 8/2017 |
| WO | 2017194018 A1 | 11/2017 |
| WO | 2018047885 A1 | 3/2018 |

OTHER PUBLICATIONS

International Search Report of PCT/CN2019/072429 dated Sep. 26, 2019 with English translation, (4p).

(Continued)

*Primary Examiner* — Jenkey Van
(74) *Attorney, Agent, or Firm* — Arch & Lake LLP

(57) ABSTRACT

A method, device, and non-transitory computer-readable storage medium are provided. The method may be applied to a base station. The base station may receive a random access preamble, transmitted by a terminal through an unlicensed band. The base station may occupy, in a first time window, a first control channel in the unlicensed band through a Listen Before Talk (LBT) mechanism without backoff. The first time window may be a time window where the terminal occupies the unlicensed band. The base station may transmit a first random access feedback is transmitted through the first control channel. The first random access feedback may indicate that the base station receives the random access preamble.

14 Claims, 8 Drawing Sheets

(56) References Cited

U.S. PATENT DOCUMENTS

| | | | |
|---|---|---|---|
| 2019/0104549 A1* | 4/2019 | Deng | H04W 52/365 |
| 2019/0132882 A1* | 5/2019 | Li | H04W 74/0833 |
| 2019/0166622 A1* | 5/2019 | Kim | H04W 74/00 |
| 2019/0215870 A1* | 7/2019 | Babaei | H04W 74/0833 |
| 2019/0387546 A1* | 12/2019 | Li | H04L 27/26025 |
| 2020/0077446 A1* | 3/2020 | Agiwal | H04W 74/0833 |
| 2020/0120716 A1* | 4/2020 | He | H04W 72/1268 |
| 2021/0212110 A1* | 7/2021 | Zhang | H04W 72/0453 |

OTHER PUBLICATIONS

CMCC, "Discussion on Uplink Control Signalling Transmission for LAA", 3GPP TSG RAN WG1 Meeting #84 R1-160496, St. Julian's, Malta, Feb. 19, 2016, (2p).

Samsung, "LBT Types for NR-U", 3GPP TSG-RAN WG2 Meeting #104 R2-1817094 (Resubmission of R2-1813639), Spokane, WA, Nov. 16, 2018, (2p).

Extended European Search Report of EP Application No. 19910817.6 dated Jun. 30, 2022, (12p).

ZTE "Discussion on enhancement of initial access procedures for NR-U", 3GPP TSG RAN WG1 Ad-Hoc Meeting 1901, R1-1900101, Taipei, Taiwan, Jan. 21-25, 2019, (11p).

Oppo, "Channel access procedures for NR-U", 3GPP TSG RAN WG1 Ad-Hoc Meeting 1901, R1-1900272, Taipei, Taiwan, Jan. 21-25, 2019, (5p).

3GPP TS 36.321 V15.4.0 (Dec. 2018) Technical Specification Group Radio Access Network; Evolved Universal Terrestrial Radio Access (E-UTRA); Medium Access Control (MAC) protocol specification (Release 15), 3GPP Draft; 36321-F40, SophiaAntipolis Cedex, Valbonne, France, Jan. 13, 2019, (131p).

Office Action issued to Indian Application No. 202147036842 dated Mar. 21, 2022 with partial English translation, (6p).

* cited by examiner

| indication information 1 | indication information 2 | indication information 3 | filling bit |

FIG. 6

| reserved bits | reserved bits | reserved bits | TA command | | |
|---|---|---|---|---|---|
| TA command | | | | | uplink grant |
| uplink grant | | | | | |
| uplink grant | | | | | |
| uplink grant | | | | | |
| cell radio network temporary identifier (C-RNTI) | | | | | |
| cell radio network temporary identifier (C-RNTI) | | | | | |

FIG. 7

| RAPID MAC RAR | RAPID MAC RAR | RAPID MAC RAR | ... | RAPID MAC RAR |

FIG. 8

| extension field | field type | random access preamble index | | | | |

FIG. 9

ACCESS FEEDBACK METHOD, BASE STATION, TERMINAL, AND STORAGE MEDIUM

CROSS-REFERENCE TO RELATED APPLICATION

This application is a national phase of International Application No. PCT/CN2019/072429, filed on Jan. 18, 2019, the entire contents of which are incorporated herein by reference for all purposes.

TECHNICAL FIELD

The disclosure relates to the field of communication technologies, and specifically to an access feedback method and apparatus, a base station, a terminal, and a storage medium.

BACKGROUND

Uplink synchronization means that uplink signals transmitted by terminals at different positions in the same cell may reach a base station synchronously. In a wireless communication system, a terminal generally establishes uplink synchronization with a base station during a random access process, thereby reducing interference among different terminals and improving system performance.

During the random access process, a terminal transmits a random access preamble to a base station. The base station receives the random access preamble, and transmits a random access feedback to the terminal in a preset time window. The random access feedback is configured to indicate that the base station receives the random access preamble. Accordingly, when the terminal receives the random access feedback in a preset time window, it is determined that the random access preamble is successfully transmitted, and uplink synchronization is established with the base station based on the random access feedback. When the terminal doesn't receive the random access feedback in a preset time window, it is determined that the random access preamble fails to be transmitted, and the random access preamble may be retransmitted.

The conventional random access process is performed through a licensed band. However, with the rapid growth of mobile data, available licensed bands gradually tend to be saturated, and band shortage occurs at present. In order to solve the problem, a 3rd Generation Partnership Project (3GPP) proposes a scheme for the random access process through an unlicensed band thereby for data transmission. However, as illustrated in FIG. 1, in the scheme, the base station needs to occupy a channel through a Listen Before Talk (LBT) mechanism, and transmits the random access feedback through the occupied channel. If the base station fails to occupy the channel in the preset time window; it may not transmit the random access feedback, and the terminal may not receive the random access feedback in the preset time window. Therefore, it may be mistaken that the random access preamble fails to be transmitted, and the terminal may retransmit the random access preamble, which may increase an unnecessary delay, waste communication resources, and cause interference on other devices.

SUMMARY

The disclosure provides an access feedback method, device, and a non-transitory computer-readable storage medium, which may improve the related art.

According to a first aspect of the present disclosure, a method for access feedback is provided. The method may be applied to a base station. The base station may receive a random access preamble transmitted by a terminal through an unlicensed band. The base station may occupy, in a first time window, a first control channel in the unlicensed band through a Listen Before Talk (LBT) mechanism without backoff. The first time window is a time window where the terminal occupies the unlicensed band. The base station may transmit a first random access feedback through the first control channel. The first random access feedback may indicate that the base station receives the random access preamble.

According to a second aspect of the present disclosure, a method for access feedback is provided. The method may be applied to a terminal. The terminal may occupy an unlicensed band, and may transmit a random access preamble to a base station through the unlicensed band. The terminal may receive, in a first time window, a first random access feedback transmitted by the base station through a first control channel in the unlicensed band. The first random access feedback may indicate that the base station receives the random access preamble. The first time window being a time window where the terminal occupies a unlicensed band. The terminal may determine that the random access preamble is successfully received by the base station based on the first random access feedback.

According to a third aspect of the present disclosure, an apparatus is provided. The apparatus may include one or more processors, a non-transitory computer-readable memory storing instructions executable by the one or more processors. The one or more processors may be configured to receive a random access preamble transmitted by a terminal through an unlicensed band. The one or more processors may also be configured to occupy, in a first time window, a first control channel in the unlicensed band through a Listen Before Talk (LBT) mechanism without backoff. The first time window may be a time window where the terminal occupies the unlicensed band. The one or more processors may also be configured to transmit a first random access feedback through the first control channel. The first random access feedback may indicate that the base station receives the random access preamble.

BRIEF DESCRIPTION OF THE DRAWINGS

The drawings, which are incorporated in and constitute a part of this specification, illustrate embodiments consistent with the disclosure and, together with the description, serve to explain the principles of the disclosure.

FIG. 6 is a schematic diagram illustrating a structure of a first random access feedback according to an example embodiment.

FIG. 7 is a schematic diagram illustrating a structure of a second random access feedback according to an example embodiment.

FIG. 8 is a diagram illustrating a structure of a MAC layer message according to an example embodiment.

FIG. 9 is a diagram illustrating a structure of a MAC PDU header according to an example embodiment.

DETAILED DESCRIPTION

To make purposes, technical solutions, and advantages of the disclosure clearer, the disclosure is further described in detail with reference to the embodiments and drawings. The exemplary embodiments of the disclosure and the descriptions thereof are used to explain the disclosure, and do not constitute the limitation on the disclosure.

The embodiments of the disclosure provide an access feedback method and apparatus, a base station, a terminal, and a storage medium. The following is a detailed description with reference to the disclosure.

Figure 1:
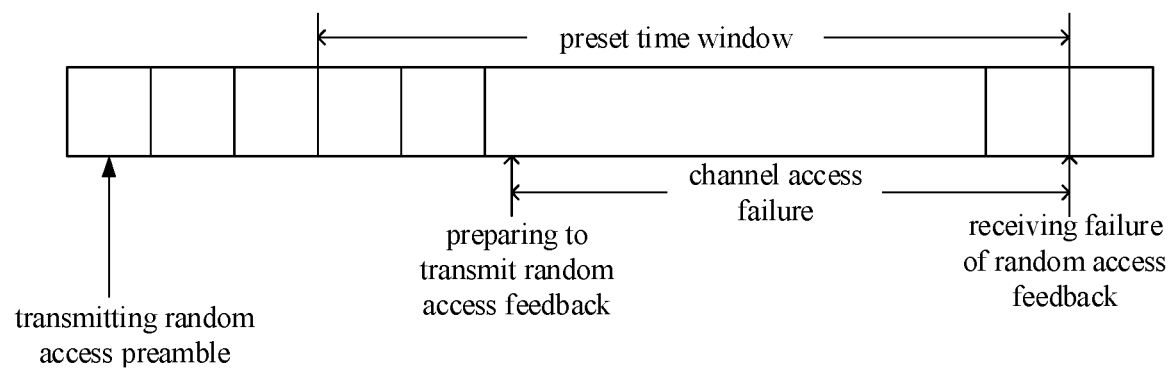
FIG. 1 is a schematic diagram illustrating a base station failing to access a channel according to an example embodiment.
Figure 2:
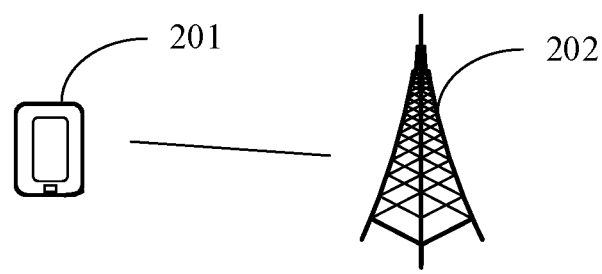
FIG. 2 is a schematic diagram illustrating a structure of a communication system according to an example embodiment.

FIG. 2 is a schematic diagram illustrating a structure of a communication system according to an example embodiment. As illustrated in FIG. 2, the communication system includes a terminal 201 and a base station 202. The terminal 201 and the base station 202 are connected through a communication network.

In embodiments of the disclosure, the terminal 201 may occupy an unlicensed band, and communicate with the base station 202 through the unlicensed band.

During the random access process, the terminal 201 transmits a random access preamble to the base station 202. The base station 202 receives the random access preamble transmitted by the terminal 201, transmits a first random access feedback to the terminal in a first time window, and transmits a second random access feedback in a second time window. The first time window is a time window where the terminal occupies the unlicensed band, and the second time window is located after the first time window.

Figure 3:
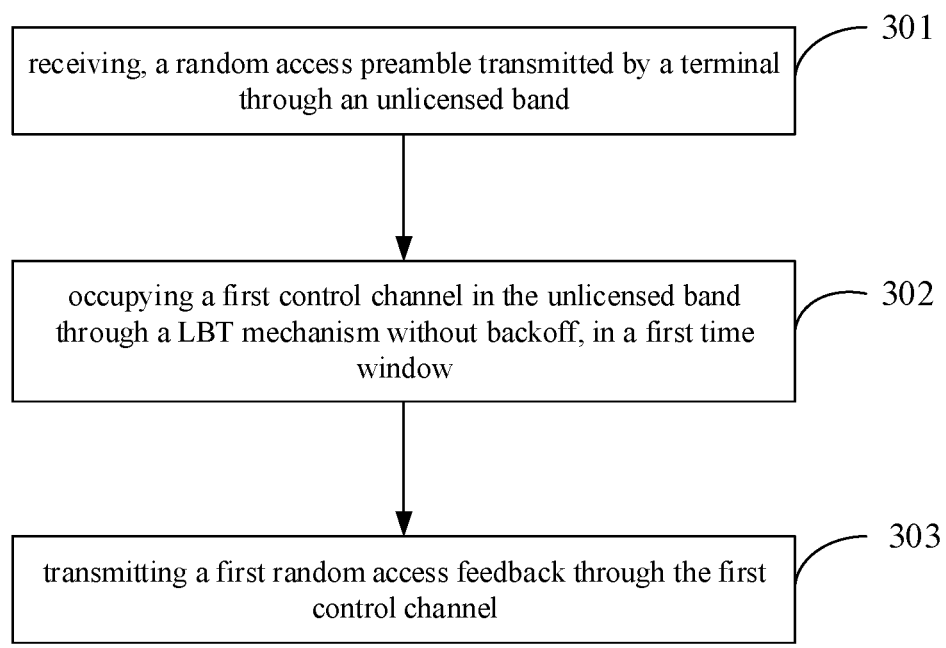
FIG. 3 is a flowchart illustrating an access feedback method according to an example embodiment.

FIG. 3 is a flowchart illustrating an access feedback method according to an example embodiment, which is applicable to the base station as illustrated in FIG. 2. As illustrated in FIG. 3, the method includes the following.

At block 301, a random access preamble, transmitted by a terminal through an unlicensed band, is received.

At block 302, a first control channel in the unlicensed band is occupied through a Listen Before Talk (LBT) mechanism without backoff, in a first time window.

The first time window is a time window where the terminal occupies the unlicensed band.

At block 303, first random access feedback is transmitted through the first control channel.

The first random access feedback is for indicating that the base station receives the random access preamble.

With the method provided in embodiments of the disclosure, the base station receives, the random access preamble transmitted by the terminal through the unlicensed band. The base station occupies the first control channel in the unlicensed band through the LBT mechanism without backoff, in the first time window, and transmits the first random access feedback through the first control channel, in which the first time window is a time window where the terminal occupies the unlicensed band. The first random access feedback may be for indicating that the base station receives the random access preamble. The terminal receives, the first random access feedback transmitted by the base station through the first control channel, in the first time window: The terminal determines that the random access preamble is successfully received by the base station. The random access preamble may not need to be retransmitted, which reduces an unnecessary delay, avoids communication resource waste and interference on other devices.

In a possible implementation, the first random access feedback includes indication information of the random access preamble.

The indication information is the random access preamble, or, the indication information is the identifier of the random access preamble.

In another possible implementation, the method further includes the following.

A second control channel in the unlicensed band is occupied through a LBT mechanism without backoff, in the first time window.

A control signaling is transmitted through the second control channel. The control signaling carries resource indication information, the resource indication information for indicating a resource of transmitting the first random access feedback in the first control channel in the first time window:

Transmitting the first random access feedback through the first control channel, includes: transmitting the first random access feedback through the resource.

In another possible implementation, the method further includes the following.

The first random access feedback is scrambled through a random access radio network temporary identifier (RA-RNTI), in which the RA-RNTI is determined by a resource of transmitting the random access preamble.

In another possible implementation, the method further includes the following.

A third control channel in the unlicensed band is occupied through a LBT mechanism with random backoff and non-fixed window size, in a second time window after the first time window.

A second random access feedback is transmitted through the third control channel, the second random access feedback including indication information and control information of the random access preamble, the control information including at least one of an uplink (UL) grant, a timing advance (TA) command, and a cell radio network temporary identifier (C-RNTI).

In another possible implementation, the first random access feedback includes a plurality of pieces of indication information corresponding to random access preambles transmitted by a plurality of terminals.

The method further includes: filling a preset value at a bit after the plurality of pieces of indication information in response that a bit length of the plurality of pieces of indication information is less than a preset length, so that a bit length of the first random access feedback after filling is equal to the preset length.

Figure 4:
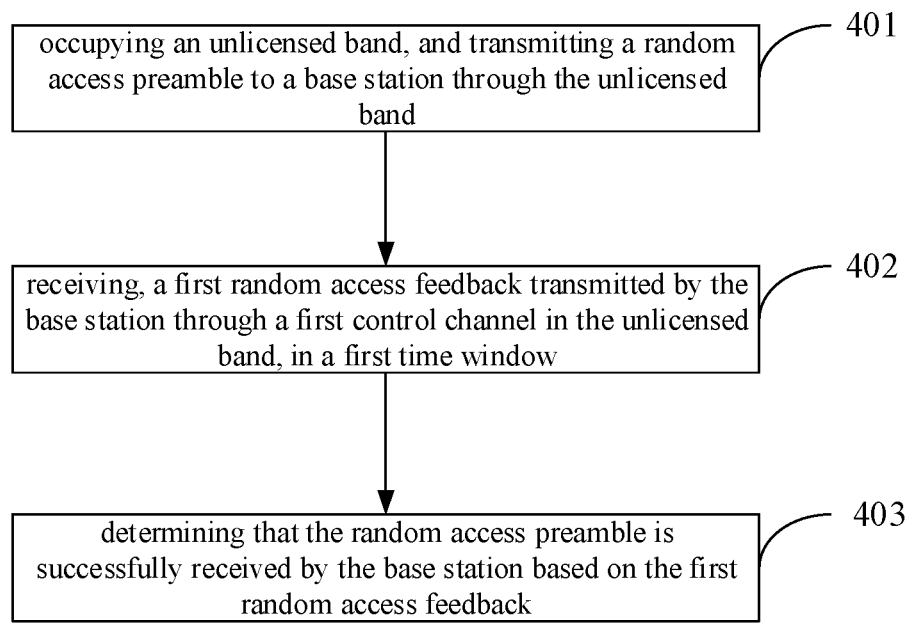
FIG. 4 is a flowchart illustrating an access feedback method according to an example embodiment.

FIG. 4 is a flowchart illustrating an access feedback method according to an example embodiment, which is applicable to the terminal as illustrated in FIG. 2. As illustrated in FIG. 4, the method includes the following.

At block 401, an unlicensed band is occupied, and a random access preamble is transmitted to a base station through the unlicensed band.

At block 402, a first random access feedback transmitted by the base station through a first control channel in the unlicensed band, is received in a first time window.

The first random access feedback may be for indicating that the base station receives the random access preamble. The first time window is a time window where the terminal occupies the unlicensed band.

At block 403, it is determined that the random access preamble is successfully received by the base station based on the first random access feedback.

With the method provided in embodiments of the disclosure, the terminal occupies the unlicensed band, transmits the random access preamble to the base station through the physical random access channel in the unlicensed band, receives the first random access feedback transmitted by the base station through the first control channel in the unlicensed band in the first time window; and determines that the random access preamble is successfully transmitted based on the first random access feedback. The first random access feedback is for indicating that the base station receives the random access preamble. The first time window is the time window where the terminal occupies the unlicensed band. The terminal receives the first random access feedback in the first time window, and determines that the random access preamble is successfully received by the base station, without necessarily retransmitting the random access preamble, which reduces an unnecessary time delay, avoids communication resource waste and interference on other devices.

In a possible implementation, the method further includes the following.

It is determined that the random access preamble fails to be transmitted in response not receiving the first random access feedback in the first time window; and the random access preamble is retransmitted to the base station through a physical random access channel.

In another possible implementation, determining that the random access preamble is successfully received by the base station based on the first random access feedback, includes the following.

It is determined that the random access preamble is successfully received by the base station in response that indication information in the first random access feedback is same with indication information of the random access preamble transmitted by the terminal, the indication information being the random access preamble, or, the indication information being an identifier of the random access preamble.

In another possible implementation, the method further includes the following.

A control signaling transmitted by the base station through a second control channel in the unlicensed band, is received in the first time window, the control signaling carrying resource indication information.

A resource of transmitting the first random access feedback in the first control channel in the first time window is determined based on the resource indication information.

Receiving, the first random access feedback transmitted by the base station through the first control channel in the unlicensed band, in the first time window, includes: receiving the first random access feedback through the resource.

In another possible implementation, the first random access feedback is scrambled through a random access radio network temporary identifier (RA-RNTI), the RA-RNTI is determined by a resource of transmitting the random access preamble: the method further include the following.

The first random access feedback is descrambled through the RA-RNTI.

In another possible implementation, the method further includes the following.

A second random access feedback transmitted by the base station through a third control channel in the unlicensed band, is received in a second time window after the first time window; the second random access feedback including indication information and control information of the random access preamble, the control information including at least one of an uplink (UL) grant, a timing advance (TA) command, and a cell radio network temporary identifier (C-RNTI).

Uplink synchronization is established with the base station based on the second random access feedback.

Figure 5:
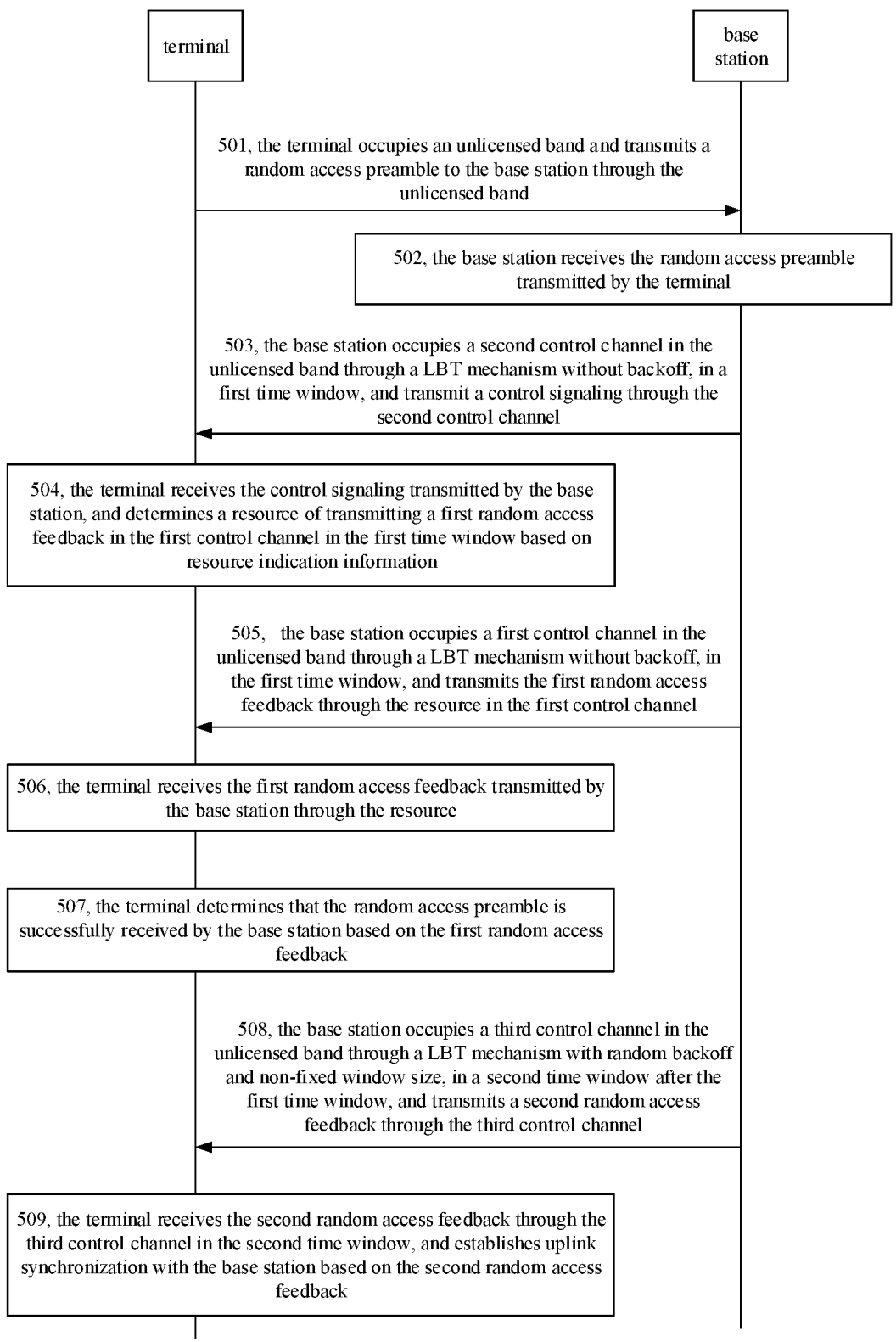
FIG. 5 is a flowchart illustrating an access feedback method according to an example embodiment.

FIG. 5 is a flowchart illustrating an access feedback method according to an example embodiment. The interaction objects may be a base station and a terminal. As illustrated in FIG. 5, the method includes the following.

At block 501, the terminal occupies an unlicensed band and transmits a random access preamble to the base station through the unlicensed band.

At block 502, the base station receives the random access preamble transmitted by the terminal.

Generally, the base station may configure a licensed band, and the base station and the terminal may communicate with each other through the licensed band. In order to solve the problem of frequency band shortages, the base station may also configure the unlicensed band, and the base station and the terminal may communicate with each other through the unlicensed band. The unlicensed band is different from the licensed band.

However, since the unlicensed band is a public band, any device may occupy the unlicensed band through a Listen Before Talk (LBT) when using the unlicensed band.

Occupying the unlicensed band through the LBT mechanism refers to detecting a state of the unlicensed band, and occupying the unlicensed band successfully when the unlicensed band is in an idle state so that communication may be carried out through the unlicensed band, and failing to occupy the unlicensed band when the unlicensed band is in a busy state.

At present, the following four mechanisms are proposed.
1. a no LBT mechanism, referred to as Category 1 LBT (CAT 1 LBT);
2. a LBT mechanism without backoff, referred to as Category 2 LBT (CAT 2 LBT);
3. a LBT mechanism with random backoff and fixed window size, referred to as Category 3 LBT (CAT 3 LBT);
4. a LBT mechanism with random backoff and non-fixed window size, referred to as Category 4 LBT (CAT 4 LBT).

The embodiments of the disclosure are applicable to the random access process of the terminal. When the terminal needs to establish uplink connection with the base station, the random access preamble is obtained, and the unlicensed band is occupied through the LBT mechanism. When occupying successfully, the terminal may transmit the random access preamble to the base station through the unlicensed band. The base station receives the random access preamble through this unlicensed band, thereby knowing that the terminal needs to establish uplink synchronization with the base station.

The terminal may occupy the unlicensed band through any one LBT mechanism in the four LBT mechanisms, for example, the CAT 2 LBT mechanism or the CAT 4 LBT mechanism, which will not be limited herein.

In addition, the random access preamble may be randomly selected by the terminal from the plurality of random access preambles configured by the base station, or may be configured for the terminal by the base station, or may be determined in other ways. The random access preamble may be configured as an indication identifier for the terminal to establish uplink synchronization with the base station, and subsequently, the base station may realize the synchronization based on the random access preamble of the terminal. Moreover, the random access preambles at different terminals are different, so that conflicts among different terminals may be avoided.

In a possible implementation, when the terminal occupies the unlicensed band successfully, the terminal transmits the random access preamble to the base station through a physical random access channel in the unlicensed band, and the base station receives the random access preamble through the physical random access channel, thereby knowing that the terminal needs to establish uplink synchronization with the base station. The physical random access channel is a channel for the terminal to transmit the random access preamble to the base station, which may be the physical random access channel (PRACH) or may be other channels configured to transmit the random access preamble. Before the terminal transmits the random access preamble, the base station may indicate the terminal the physical random access channel in the unlicensed band through broadcasting, or the base station may preconfigure the physical random access channel in the unlicensed band for the terminal, or the physical random access channel in the unlicensed band may be determined in other ways.

At block 503, the base station occupies a second control channel in the unlicensed band through a LBT mechanism without backoff, in a first time window; and transmit a control signaling through the second control channel.

In the related art, the terminal transmits the random access preamble. After the base station receives the random access preamble, the base station should transmit the random access feedback to the terminal in a preset time window; to indicate the terminal that the base station has received the random access preamble. If the terminal doesn't receive the random access feedback in the preset time window, it is determined that the random access preamble fails to be transmitted and the random access preamble may be retransmitted.

However, in the scene of the unlicensed band, if the base station fails to occupy the channel in the preset time window; it may not transmit the random access feedback, and the terminal may not receive the random access feedback in the preset time window. Therefore, it may be mistaken that the random access preamble fails to be transmitted, and the terminal may enhance the power to retransmit the random access preamble.

In order to solve the technical problem, the embodiments of the disclosure provide a method for transmitting by the base station the random access feedback in advance. Since the terminal occupies the unlicensed band successfully, it may occupy the unlicensed band continuously for a duration, in which the duration may be a time window the terminal occupies the unlicensed band. However, after the terminal transmits the random access preamble, the unlicensed band may be in the idle state. Then, in the time window; the base station may rapidly occupy the unlicensed band through the LBT mechanism without backoff, thereby rapidly transmitting the random access feedback through the unlicensed band.

Therefore, in order to transmit the random access feedback in advance, the base station may transmit the control signaling through occupying the unlicensed band in the first time window after receiving the random access preamble, to indicate the resource of transmitting a first random access feedback by the base station, and transmits the first random access feedback through the resource, in which the first random access feedback may be to indicate that the base station has successfully received the random access preamble.

Therefore, the base station occupies the second control channel in the unlicensed band through the LBT mechanism without backoff in the first time window first, in which the first time window is the time window where the terminal occupies the unlicensed band. The base station transmits the control signaling through the second control channel when the second control channel is occupied successfully:

The first time window may be preconfigured by the base station, and the second control signaling may be a physical downlink control channel (PDCCH) or other channels. The control signaling includes resource indication information. The resource indication information may be configured for indicating a resource of transmitting the first random access feedback in the first control channel in the first time window, which may be a time domain resource and/or a frequency domain resource, or may be other resources. The control signaling may be Downlink Control Information (DCI) or other types of signaling.

At block 504, the terminal receives the control signaling transmitted by the base station, and determines the resource of transmitting the first random access feedback in the first control channel in the first time window based on the resource indication information.

The base station transmits the control signaling through the second control channel, and the terminal receives the control signaling through the second control channel, and determines the resource of transmitting the first random access feedback in the first control channel in the first time window based on the resource indication information in the control signaling. Subsequently, the terminal receives the first random access feedback transmitted by the base station through the resource.

It should be noted that actions at blocks 503 to 504 are optional schemes. In another embodiment, actions at blocks 503 to 504 may not be executed, and the terminal may be informed the resource of transmitting the first random access feedback in other ways, and the base station transmits the random access feedback directly by executing actions at blocks 505 to 507 without necessarily transmitting the control signaling after receiving the random access preamble transmitted by the terminal.

At block 505, the base station occupies a first control channel in the unlicensed band through a Listen Before Talk (LBT) mechanism without backoff, in the first time window; and transmits the first random access feedback through the resource in the first control channel.

At block 506, the terminal receives the first random access feedback transmitted by the base station through the resource.

After the base station transmits the control signaling through the second control channel, it occupies the first control channel in the unlicensed band through the LBT mechanism without backoff and transmits the first random access feedback through the resource indicated by the control signaling. The first random access feedback is configured for indicating that the base station receives the random access preamble.

Since it still belongs to the time window the terminal occupies the unlicensed band at this time, the base station may rapidly occupy the first control channel through the LBT mechanism without backoff, thereby transmitting the first random access feedback in the first time window: The terminal receives the first random access feedback through the resource, that is, may receive the first random access feedback in the first time window.

The first time window may be the physical downlink shared channel (PDSCH) or other channels.

In one possible implementation, the first random access feedback includes indication information of the random access preamble, and the indication information may be the random access preamble itself or the identifier of the random access preamble, in which, the identifier may uniquely correspond to the random access preamble, which may be a Random Access Preamble Index (RAPID) or an index of the random access preamble, or may be other identifiers that uniquely correspond to the random access preamble. The identifier may contain any number of bits, such as 6 bits.

In another possible implementation, the base station scrambles the first random access feedback through a Random Access Radio Network Temporary Identifier (RA-RNTI), in which, the RA-RNTI is determined by the resource of transmitting the random access preamble. Only the terminal, which has the RA-RNTI corresponding to the resource of transmitting the random access preamble same with the RA-RNTI configured when scrambling, may descramble the first random access feedback through the correct RA-RNTI, thereby receiving the first random access feedback and reading the information carried in the first random access feedback.

In another possible implementation, since a plurality of terminals are independent with each other, it may commonly compete the unlicensed band. When the plurality of terminals successfully occupy the unlicensed band at the same time, random access preambles may be transmitted through the same resource in the unlicensed band, which leads to receiving the random access preambles of the plurality of terminals by the base station at the same time.

In this case, as illustrated in FIG. 6, the base station transmits the first random access feedback based on the plurality of random access preambles received. The first random access feedback carries a plurality of pieces of indication information corresponding to the plurality of random access preambles. In order to keep the length of the first random access feedback consistent, the base station may configure a preset length, generate the first random access feedback with the bit length equal to the preset length, and fill the plurality of pieces of indication information to the first random access feedback. When the bit length of the plurality of pieces of indication information is less than the preset length, a preset value is filled at a bit after the plurality of pieces of indication information, so that the bit length of the first random access feedback after filling is equal to the preset length. The preset length may be any positive integer, and the preset value may be 0, 1 or other value.

In addition, the base station may further configure a preset number, and the number of indication information transmitted in the first random access feedback should not exceed the preset number, that is, the random access feedback may be performed on the preset number of terminals at most each time.

At block 507, the terminal determines that the random access preamble is successfully received by the base station based on the first random access feedback.

The terminal may determine that the random access preamble is successfully received by the base station after receiving the first random access feedback in the first time window; thereby determining that the random access preamble does not need to be retransmitted. In the subsequent process, the terminal may wait to receive the second random access feedback in the second time window after the first time window, thereby performing uplink synchronization based on the second random access feedback.

In a possible implementation, when the indication information in the first random access feedback is same with the indication information of the random access preamble transmitted by the terminal, it is determined that the random access preamble is successfully received by the base station. In a possible implementation, when the indication information in the first random access feedback is different from the indication information of the random access preamble transmitted by the terminal, it is determined that the random access preamble fails to be transmitted, and the random access preamble is retransmitted. The indication information may be the random access preamble itself, or the identifier of the random access preamble.

In another possible implementation, when the first random access feedback includes a plurality of pieces of indication information, it is determined whether the plurality of pieces of indication information include the indication information of the random access preamble transmitted by the terminal. If the plurality of pieces of indication information include the indication information of the random access preamble transmitted by the terminal, it is determined that the random access preamble is successfully received by the base station: if the plurality of pieces of indication information do not include the indication information of the random access preamble transmitted by the terminal, it is determined that the random access preamble fails to be transmitted, and the random access preamble is retransmitted.

The embodiment of the disclosure is only illustrated by taking the terminal receiving the first random access feedback in the first time window as an example, and in another embodiment, if the base station does not receive the random access preamble transmitted by the terminal, it may not transmit the first random access feedback in the first time window: If the terminal doesn't receive the random access feedback in the first time window; it is determined that the random access preamble fails to be transmitted, and the random access preamble needs to be retransmitted.

Therefore, the terminal reoccupies the unlicensed band, and transmits the random access preamble to the base station through the physical random access channel in the unlicensed band rather than retransmitting the random access preamble when the random access feedback is not received in the second time window; so that the random access preamble may be retransmitted in advance in case that the random access preamble fails to be transmitted, which shortens the delay and improves the efficiency of the random access process.

At block 508, the base station occupies a third control channel in the unlicensed band through a LBT mechanism with random backoff and non-fixed window size, in a second time window after the first time window, and transmits a second random access feedback through the third control channel.

At block 509, the terminal receives the second random access feedback through the third control channel in the second time window, and establishes uplink synchronization with the base station based on the second random access feedback.

The second time window is located after the first time window, or adjacent to the first time window; or has a certain time internal with the first time window: The second time window may be preconfigured by the base station.

It takes a certain time internal from receiving by the base station the random access preamble to preparing by the base station to transmit the random access feedback. Therefore, the second time window the base station transmits the second random access feedback may no longer belong to the time window the terminal occupies the unlicensed band. If the base station transmits the second random access feedback in the second time window; the third control channel in the unlicensed band needs to be reoccupied through the LBT mechanism with random backoff and non-fixed window size.

The third control channel may be a PDSCH or other channels, and the third control channel and the first control channel may be same or may be different.

The second random access feedback includes indication information and control information of the random access preamble, the control information including at least one of an uplink (UL) grant, a timing advance (TA) command, and a cell radio network temporary identifier (C-RNTI). The UL is configured to indicate a grant allowing the terminal to transmit data to the base station. The TA command is configured to indicate the time the terminal transmits data to the base station in advance. The C-RNTI is a dynamic identifier allocated to the terminal by the base station, uniquely identifying the terminal under one cell air interface, and only the C-RNTI of the terminal in the connected state is valid. For example, the second random access feedback may be as illustrated in FIG. 7.

In one possible implementation, the second random access feedback may also include indication information and control information of the plurality of terminals. A corresponding relationship may be established between the indication information and the control information of the same terminal. Each terminal may acquire corresponding control information based on the indication information of the random access preamble of the terminal, and establish uplink synchronization with the base station based on the acquired control information.

For example, referring to FIG. 8, the second random access feedback is transmitted by a message of Media Access Control (MAC) Protocol Date Unit (PDU) layer, and the indication information and the control information of the plurality of terminals are multiplexed in one message of MAC PDU layer. In each MAC PDU, as illustrated in FIG. 9, by distinguishing different terminals through a RAPID on a header of a MAC PDU, the control information is issued through a MAC Random Access Response (MAC RAR).

The differences between the second random access feedback and the first random access feedback are as illustrated in Table 1. Referring to Table 1, the first random access feedback contains less information, and it takes less time to transmit the first random access feedback, so as to achieve rapid transmission, thereby quickly informing the terminal the base station has received the random access preamble. However, the second random access feedback contains more information, and it takes more time to transmit the second random access feedback, and the terminal may establish uplink synchronization with the base station based on the second random access feedback.

TABLE 1

| | first random access feedback | second random access feedback |
|---|---|---|
| transmitting channel transmitting content | first control channel (PDSCH) indication information: RAPID | third control channel (PDSCH) indication information and control information: RAPID, uplink grant, timing advance command, cell radio network temporary identifier |
| LBT way transmitting time window | CAT 2 LBT first time window | CAT 4 LBT second time window after first time window |

Figure 10:
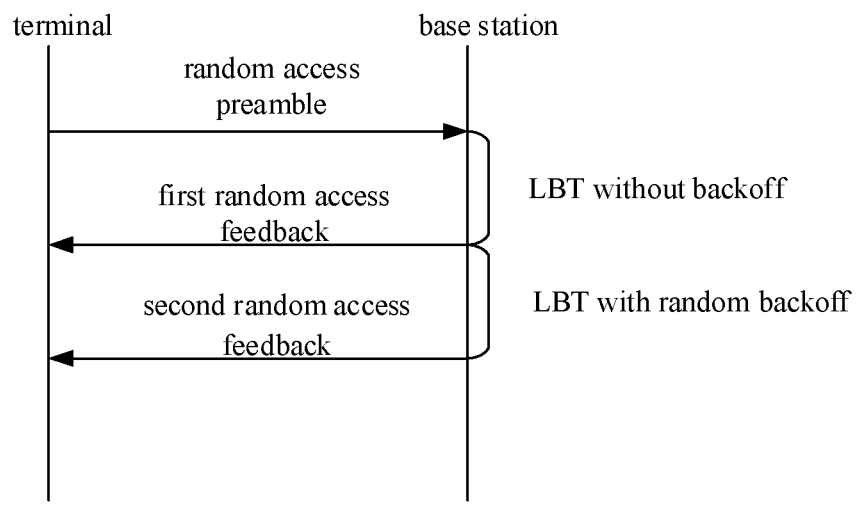
FIG. 10 is a flowchart illustrating an access feedback according to an example embodiment.
Figure 11:
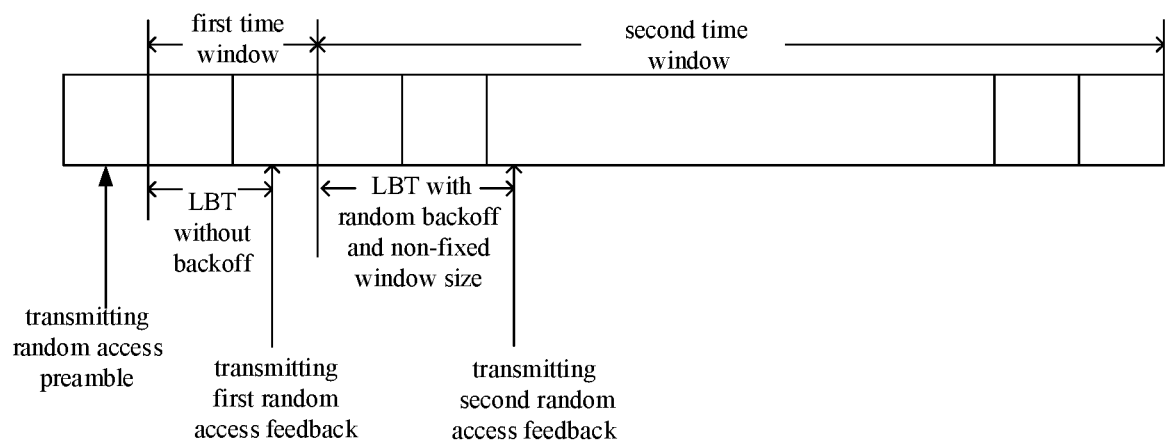
FIG. 11 is a time sequence diagram illustrating another access feedback according to an example embodiment.

In the embodiment of the disclosure, as illustrated in FIG. 10 and FIG. 11, after the terminal occupies the unlicensed band and transmits the random access preamble to the base station, the channel may be accessed quickly through the LBT without backoff in the time window the terminal occupies the unlicensed band, and the first random access feedback is quickly fed back. This feedback is only configured to confirm that the random access preamble is successfully received by the base station. After the first random access feedback is transmitted, the base station accesses the channel through the LBT with backoff and non-fixed window size and transmits the conventional second random access feedback.

It should be noted that before the actions at blocks 408 to 409, the base station may also occupy a control channel through a LBT mechanism with random backoff and non-fixed window size, and transmit a control signaling to the terminal through the control channel, in which the control signaling includes resource indication information configured to transmit the second random access feedback in the third control channel. The terminal may determine the corresponding resource upon receiving the control signaling. At blocks 408 to 409, the base station transmits the second random access feedback through the resource in the third control channel, and the terminal receives the second random access feedback through the resource.

In the method provided in embodiments of the disclosure, the terminal occupies the unlicensed band and transmits the random access preamble to the base station through the physical random access channel in the unlicensed band. After the base station receives the random access preamble in the physical random access channel, the base station occupies the first control channel and the second control channel in the unlicensed band through the LBT mechanism without backoff in the first time window the terminal occupies the unlicensed band, transmits the control signaling indicating the resource of the first control channel of the first random access feedback through the second control channel first, and then transmits the first random access feedback through the resource of the first control channel. The terminal receives the first random access feedback through the resource of the first control channel in the first time window based on the control signaling, and determines that the random access preamble is successfully received by the base station, without necessarily retransmitting the random access preamble, which reduces the unnecessary delay, avoids communication resource waste and interference on other devices.

The embodiments of the disclosure provide a random access feedback method applicable to an unlicensed band, which effectively avoids the situation that the terminal redundantly transmits the random access preamble due to the influence of LBT in the unlicensed band scene, thereby reducing random access delay on the whole.

Figure 12:
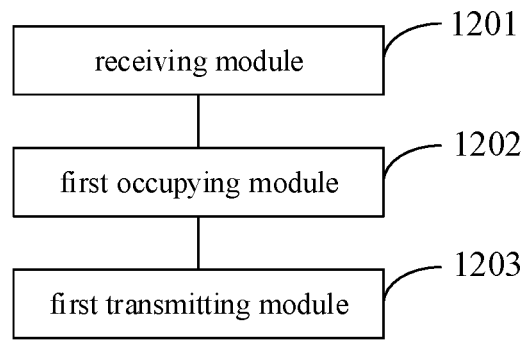
FIG. 12 is a block diagram illustrating an access feedback apparatus according to an example embodiment.

FIG. 12 is a block diagram illustrating an access feedback apparatus according to an example embodiment. As illustrated in FIG. 12, the apparatus may be applicable to a base station. The apparatus includes a receiving module 1201, a first occupying module 1202, and a first transmitting module 1203.

The receiving module 1201 is configured to receive, a random access preamble transmitted by a terminal through an unlicensed band.

The first occupying module 1202 is configured to occupy, a first control channel in the unlicensed band through a Listen Before Talk (LBT) mechanism without backoff, in a first time window; the first time window being a time window where the terminal occupies the unlicensed band.

The first transmitting module 1203 is configured to transmit a first random access feedback through the first control channel, the first random access feedback for indicating that the base station receives the random access preamble.

With the apparatus provided in embodiments of the disclosure, the random access preamble transmitted by the terminal through the unlicensed band, may be received. The first control channel in the unlicensed band may be occupied through the LBT mechanism without backoff, in the first time window; and the first random access feedback may be transmitted through the first control channel, in which the first time window is a time window where the terminal occupies the unlicensed band. The first random access feedback may be for indicating that the base station receives the random access preamble. The terminal receives, the first random access feedback transmitted by the base station through the first control channel, in the first time window. The terminal determines that the random access preamble is successfully received by the base station. The random access preamble may not need to be retransmitted, which reduces an unnecessary delay, avoids communication resource waste and interference on other devices.

In a possible implementation, the first random access feedback includes indication information of the random access preamble.

The indication information is the random access preamble, or, the indication information is the identifier of the random access preamble.

In another possible implementation, the apparatus further includes: a second occupying module and a second transmitting module.

The second occupying module is configured to occupy, a second control channel in the unlicensed band through a LBT mechanism without backoff, in the first time window.

The second transmitting module is configured to transmit a control signaling through the second control channel, the control signaling carrying resource indication information, the resource indication information for indicating a resource of transmitting the first random access feedback in the first control channel in the first time window.

The first transmitting module 1203 is further configured to transmit the first random access feedback through the resource.

In another possible implementation, the apparatus further includes: a scrambling module.

The scrambling module is configured to scramble the first random access feedback through a random access radio network temporary identifier (RA-RNTI), the RA-RNTI being determined by a resource of transmitting the random access preamble.

In another possible implementation, the apparatus further includes: a third occupying module and a third transmitting module.

The third occupying module is configured to occupy, a third control channel in the unlicensed band through a LBT mechanism with random backoff and non-fixed window size, in a second time window after the first time window.

The third transmitting module is configured to transmit a second random access feedback through the third control channel, the second random access feedback including indication information and control information of the random access preamble, the control information including at least one of an uplink (UL) grant, a timing advance (TA) command, and a cell radio network temporary identifier (C-RNTI).

In another possible implementation, the first random access feedback includes a plurality of pieces of indication information corresponding to random access preambles transmitted by a plurality of terminals.

The apparatus further includes: a filling module, configured to fill a preset value at a bit after the plurality of pieces of indication information in response that a bit length of the plurality of pieces of indication information is less than a preset length, so that a bit length of the first random access feedback after filling is equal to the preset length.

It should be noted that, when the access feedback apparatus provided in the above embodiments performs the access feedback, only the division of the above function modules is given as an example. In practical applications, the above functions may be allocated to different function modules for completing based on actual requirements, that is, the internal structure of the base station is divided into different function modules to complete all or part of functions described above. In addition, the access feedback apparatus provided in the embodiments and the access feedback method in the embodiments belong to the same concept. For the detailed implementation process, reference should be made to the method embodiments, which is not repeated herein.

Figure 13:
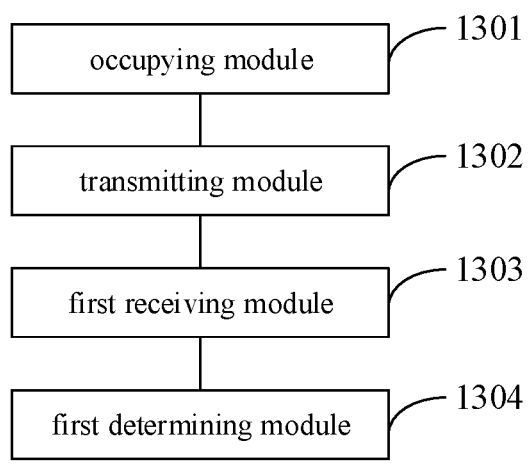
FIG. 13 is a block diagram illustrating an access feedback apparatus according to an example embodiment.

FIG. 13 is a block diagram illustrating an access feedback apparatus according to an example embodiment. As illustrated in FIG. 13, the apparatus may be applicable to a terminal. The apparatus includes an occupying module 1301, a transmitting module 1302, a first receiving module 1303, and a first determining module 1304.

The occupying module 1301 is configured to occupy an unlicensed band.

The transmitting module 1302 is configured to transmit a random access preamble to a base station through the unlicensed band.

The first receiving module 1303 is configured to receive, a first random access feedback transmitted by the base station through a first control channel in the unlicensed band, in a first time window, the first random access feedback for indicating that the base station receives the random access preamble, the first time window being a time window where the terminal occupies the unlicensed band.

The first determining module 1304 is configured to determine that the random access preamble is successfully received by the base station based on the first random access feedback.

With the apparatus provided in embodiments of the disclosure, the unlicensed band may be occupied, the random access preamble may be transmitted to the base station through the physical random access channel in the unlicensed band, the first random access feedback transmitted by the base station may be received through the first control channel in the unlicensed band in the first time window, and it is determined that the random access preamble is successfully transmitted based on the first random access feedback. The first random access feedback is for indicating that the base station receives the random access preamble. The first time window is the time window where the terminal occupies the unlicensed band. The first random access feedback may be received in the first time window; and it is determined that the random access preamble is successfully received by the base station, without necessarily retransmitting the random access preamble, which reduces an unnecessary time delay, avoids communication resource waste and interference on other devices.

In a possible implementation, the first determining module 1304 is further configured to determine that the random access preamble fails to be transmitted in response not receiving the first random access feedback in the first time window.

The transmitting module 1302 is further configured to retransmit the random access preamble to the base station through a physical random access channel.

In another possible implementation, the first determining module 1304 is configured to determine that the random access preamble is successfully received by the base station in response that indication information in the first random access feedback is same with indication information of the random access preamble transmitted by the terminal, the indication information being the random access preamble, or, the indication information being an identifier of the random access preamble.

In another possible implementation, the apparatus further includes: a second receiving module and second determining module.

The second receiving module is configured to receive, a control signaling transmitted by the base station through a second control channel in the unlicensed band, in the first time window; the control signaling carrying resource indication information.

The second determining module is configured to determine a resource of transmitting the first random access feedback in the first control channel in the first time window based on the resource indication information.

The first receiving module 1303 is further configured to receive the first random access feedback through the resource.

In another possible implementation, the first random access feedback is scrambled through a random access radio network temporary identifier (RA-RNTI), the RA-RNTI is determined by a resource of transmitting the random access preamble.

The apparatus further includes: a descrambling module, configured to descramble the first random access feedback through the RA-RNTI.

In another possible implementation, the apparatus further includes: a third receiving module and an establishing module.

The third receiving module is configured to receive a second random access feedback transmitted by the base station through a third control channel in the unlicensed band, in a second time window after the first time window, the second random access feedback including indication information and control information of the random access preamble, the control information including at least one of an uplink (UL) grant, a timing advance (TA) command, and a cell radio network temporary identifier (C-RNTI).

It should be noted that, when the access feedback apparatus provided in the above embodiments performs the access feedback, only the division of the above function modules is given as an example. In practical applications, the above functions may be allocated to different function modules for completing based on actual requirements, that is, the internal structure of the terminal is divided into different function modules to complete all or part of functions described above. In addition, the access feedback apparatus provided in the embodiments and the access feedback method in the embodiments belong to the same concept. For the detailed implementation process, reference should be made to the method embodiments, which is not repeated herein.

Figure 14:
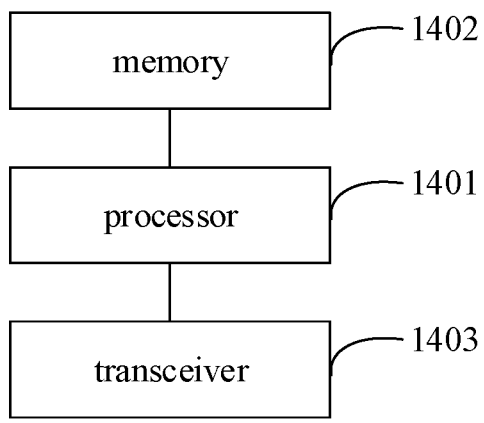
FIG. 14 is a block diagram illustrating a base station according to an example embodiment.

FIG. 14 is a block diagram illustrating a base station according to an example embodiment. As illustrated in FIG. 14, the base station includes a processor 1401, a memory 1402 configured to store instructions executable by the processor, and a transceiver 1403. The processor 1401 is configured to perform the instructions as follow.

A random access preamble, transmitted by a terminal through an unlicensed band, is received.

A first control channel in the unlicensed band is occupied through a Listen Before Talk (LBT) mechanism without backoff, in a first time window. The first time window is a time window where the terminal occupies the unlicensed band.

A first random access feedback is transmitted through the first control channel. The first random access feedback is for indicating that the base station receives the random access preamble.

A computer-readable storage medium is further provided. When the instruction in the computer-readable storage medium is performed by the processor of the base station, the base station may perform the access feedback method in the above embodiments.

Figure 15:
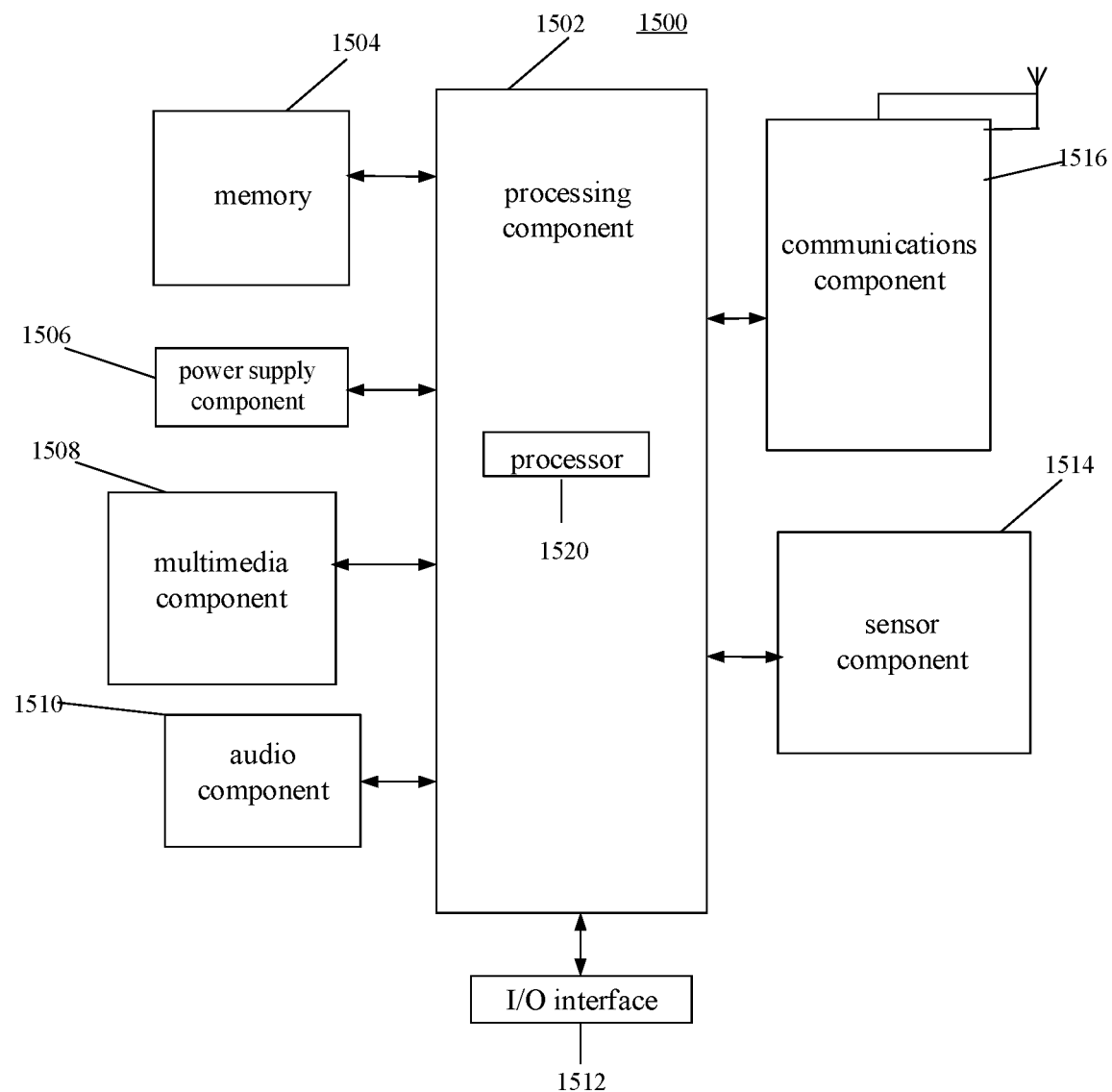
FIG. 15 is a block diagram illustrating a terminal according to an example embodiment.

FIG. 15 is a block diagram illustrating a terminal according to an example embodiment. For example, the terminal 1500 may be a mobile phone, a computer, a digital broadcasting device, a messaging device, a game console, a tablet device, medical equipment, fitness equipment, a personal digital assistant, etc.

As illustrated in FIG. 15, the terminal 1500 may include one or more components: a processing component 1502, a memory 1504, a power supply component 1506, a multimedia component 1508, an audio component 1510, an input/output (I/O) interface 1512, a sensor component 1514, and a communication component 1516.

The processing component 1502 typically controls overall operations of the terminal 1500, such as the operations associated with display, telephone calls, data communications, camera operations, and recording operations. The processing component 1502 may include one or more processors 1520 to execute instructions to perform all or part of the actions in the above described methods. In addition, the processing component 1502 may include one or more modules, which facilitate the interaction between the processing component 1502 and other components. For instance, the processing component 1502 may include a multimedia module to facilitate the interaction between the multimedia component 1508 and the processing component 1502.

The memory 1504 is configured to store various types of data to support the operation of the terminal 1500. Examples of such data include instructions for any applications or methods operated on the terminal 1500, contact data, phonebook data, messages, pictures, video, etc. The memory 1504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 1506 provides power to various components of the terminal 1500. The power component 1506 may include a power management system, one or more power sources, and any other components associated with the generation, management, and distribution of power in the terminal 1500.

The multimedia component 1508 includes a screen providing an output interface between the terminal 1500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1508 includes a front camera and/or a rear camera. The front camera and the rear camera may receive an external multimedia datum while the terminal 1500 is in an operation mode, such as a photographing mode or a video mode. Each of the front camera and the rear camera may be a fixed optical lens system or have focus and optical zoom capability.

The audio component 1510 is configured to output and/or input audio signals. For example, the audio component 1510 includes a microphone ("MIC") configured to receive an external audio signal when the terminal 1500 is in an operation mode, such as a call mode, a recording mode, and a voice recognition mode. The received audio signal may be further stored in the memory 1504 or transmitted via the communication component 1516. In some embodiments, the audio component 1510 further includes a speaker to output audio signals.

The I/O interface 1512 provides an interface between the processing component 1502 and peripheral interface modules, such as a keyboard, a click wheel, buttons, and the like. The buttons may include, but are not limited to, a home button, a volume button, a starting button, and a locking button.

The sensor component 1514 includes one or more sensors to provide status assessments of various aspects of the terminal 1500. For instance, the sensor component 1514 may detect an open/closed status of the terminal 1500, relative positioning of components, e.g., the display and the keypad, of the terminal 1500, a change in position of the terminal 1500 or a component of the terminal 1500, a presence or absence of user contact with the terminal 1500, an orientation or an acceleration/deceleration of the terminal 1500, and a change in temperature of the terminal 1500. The sensor component 1514 may include a proximity sensor configured to detect the presence of nearby objects without any physical contact. The sensor component 1514 may also include a light sensor, such as a CMOS or CCD image sensor, for use in imaging applications. In some embodiments, the sensor component 1514 may also include an accelerometer sensor, a gyroscope sensor, a magnetic sensor, a pressure sensor, or a temperature sensor.

The communication component 1516 is configured to facilitate communication, wired or wirelessly, between the terminal 1500 and other devices. The terminal 1500 can access a wireless network based on a communication standard, such as Wi-Fi, 2G, or 3G, or a combination thereof. In one exemplary embodiment, the communication component 1516 receives a broadcast signal or broadcast associated information from an external broadcast management system via a broadcast channel. In one exemplary embodiment, the communication component 1516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 1500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1504, executable by the processor 1520 in the terminal 1500, for performing the above-described methods. For example, the non-transitory computer-readable storage medium may be a ROM, a RAM, a CD-ROM, a magnetic tape, a floppy disc, an optical data storage device, and the like A computer-readable storage medium is further provided. When the instruction in the computer-readable storage medium is performed by the processor of the terminal, the terminal may perform the access feedback method in the above embodiments. The method includes the following.

An unlicensed band is occupied, and a random access preamble is transmitted to a base station through the unlicensed band.

A first random access feedback transmitted by the base station through a first control channel in the unlicensed band, is received in a first time window, the first random access feedback for indicating that the base station receives the random access preamble, the first time window being a time window where the terminal occupies the unlicensed band.

It is determined that the random access preamble is successfully received by the base station based on the first random access feedback.

Those skilled in the art may understand that all or part of the actions in the above embodiments may be implemented by hardware, or by driving relevant hardware through programs. The programs may be stored in a computer-readable storage medium which may be a read-only memory, a magnetic disk, or an optical disk, etc.

The above are only some optional embodiments in embodiments of the disclosure, and do not constitute the limitation of the disclosure. Any modification, equivalent replacement, improvement, etc., made within the spirit and principle of embodiments of the disclosure shall be included within the protection scope of embodiments of the disclosure.

What is claimed is:

1. A method for access feedback, performed by a base station, comprising:
   receiving a random access preamble transmitted by a terminal through an unlicensed band;

occupying, in a first time window, a first control channel in the unlicensed band through a Listen Before Talk (LBT) mechanism without backoff, wherein the first time window is a time window where the terminal occupies the unlicensed band; and transmitting a first random access feedback through the first control channel, wherein the first random access feedback indicates that the base station receives the random access preamble;

occupying, in a second time window after the first time window, a third control channel in the unlicensed band through a LBT mechanism with random backoff and non-fixed window size, wherein the second time window is longer than the first time window; and transmitting a second random access feedback through the third control channel, wherein the second random access feedback comprises indication information and control information of the random access preamble, wherein the control information comprises at least one of an uplink (UL) grant, a timing advance (TA) command, and a cell radio network temporary identifier (C-RNTI);

wherein the method further comprises:

occupying, in the first time window, a second control channel in the unlicensed band through a LBT mechanism without backoff;

transmitting a control signaling through the second control channel, wherein the control signaling carries resource indication information, wherein the resource indication information indicates a resource of transmitting the first random access feedback in the first control channel in the first time window;

wherein transmitting the first random access feedback through the first control channel comprises:

transmitting the first random access feedback through the resource;

wherein the first random access feedback contains less information than the second random access feedback, and rapid transmission of the first random access feedback is earlier than transmission of the second random access feedback.

2. The method as claimed in claim 1, wherein the first random access feedback comprises indication information of the random access preamble;

wherein the indication information is the random access preamble, or, the indication information is an identifier of the random access preamble.

3. The method as claimed in claim 1, further comprising:

scrambling the first random access feedback through a random access radio network temporary identifier (RA-RNTI), wherein the RA-RNTI is determined by a resource of transmitting the random access preamble.

4. The method as claimed in claim 1, further comprising:

filling a preset value at a bit after a plurality of pieces of indication information in response that a bit length of the plurality of pieces of indication information is less than a preset length, so that a bit length of the first random access feedback after filling is equal to the preset length, wherein the first random access feedback comprises the plurality of pieces of indication information corresponding to random access preambles transmitted by a plurality of terminals.

5. A non-transitory computer-readable storage medium having stored therein at least one instruction that, when loaded and executed by one or more processors, causes to perform actions performed as described in the method of claim 1.

6. A method for access feedback, comprising:

occupying an unlicensed band, and transmitting a random access preamble to a base station through the unlicensed band;

receiving, in a first time window, a first random access feedback transmitted by the base station through a first control channel in the unlicensed band, wherein the first random access feedback indicates that the base station receives the random access preamble, wherein the first time window being a time window where a terminal occupies the unlicensed band;

determining that the random access preamble is successfully received by the base station based on the first random access feedback;

receiving, in a second time window after the first time window, a second random access feedback transmitted by the base station through a third control channel in the unlicensed band, wherein the second time window is longer than the first time window, wherein the second random access feedback comprises indication information and control information of the random access preamble, wherein the control information comprises at least one of an uplink (UL) grant, a timing advance (TA) command, and a cell radio network temporary identifier (C-RNTI); and establishing uplink synchronization with the base station based on the second random access feedback;

wherein the method further comprises:

receiving, in the first time window, a control signaling transmitted by the base station through a second control channel in the unlicensed band wherein the control signaling carries resource indication information;

determining a resource of transmitting the first random access feedback in the first control channel in the first time window based on the resource indication information; and wherein receiving, in the first time window, the first random access feedback transmitted by the base station through the first control channel in the unlicensed band comprises: receiving the first random access feedback through the resource;

wherein the first random access feedback contains less information than the second random access feedback, and rapid transmission of the first random access feedback is earlier than transmission of the second random access feedback.

7. The method as claimed in claim 6, further comprising:

determining that the random access preamble fails to be transmitted in response to not receiving the first random access feedback in the first time window, and retransmitting the random access preamble to the base station through a physical random access channel.

8. The method as claimed in claim 6, wherein, determining that the random access preamble is successfully received by the base station based on the first random access feedback comprises:

determining that the random access preamble is successfully received by the base station in response to indication information in the first random access feedback being same with indication information of the random access preamble transmitted by the terminal, wherein the indication information is the random access preamble, or, the indication information is an identifier of the random access preamble.

9. The method as claimed in claim 6, further comprising:

descrambling the first random access feedback through a random access radio network temporary identifier (RA- RNTI), wherein the first random access feedback is scrambled through a RA-RNTI, wherein the RA-RNTI is determined by a resource of transmitting the random access preamble.

10. A device, comprising:
one or more processors;
a non-transitory computer-readable storage medium storing instructions executable by the one or more processors;
wherein the one or more processors are configured to perform the method of claim 6.

11. A non-transitory computer-readable storage medium having stored therein at least one instruction that, when loaded and executed by one or more processors, causes to perform actions performed as described in the method of claim 6.

12. A base station, comprising:
one or more processors;
a non-transitory computer-readable storage medium storing instructions executable by the one or more processors;
wherein the one or more processors are configured to:
receive a random access preamble transmitted by a terminal through an unlicensed band;
occupy, in a first time window, a first control channel in the unlicensed band through a Listen Before Talk (LBT) mechanism without backoff, wherein the first time window is a time window where the terminal occupies the unlicensed band;
transmit a first random access feedback through the first control channel, wherein the first random access feedback indicates that the base station receives the random access preamble; and
occupy, in a second time window after the first time window, a third control channel in the unlicensed band through a LBT mechanism with random backoff and non-fixed window size, wherein the second time window is longer than the first time window; and
transmit a second random access feedback through the third control channel, wherein the second random access feedback comprises indication information and control information of the random access preamble, wherein the control information comprises at least one of an uplink (UL) grant, a timing advance (TA) command, and a cell radio network temporary identifier (C-RNTI);
wherein the one or more processors are further configured to:
occupy, in the first time window, a second control channel in the unlicensed band through a LBT mechanism without backoff;
transmit a control signaling through the second control channel, wherein the control signaling carries resource indication information, wherein the resource indication information indicates a resource of transmitting the first random access feedback in the first control channel in the first time window; and
transmit the first random access feedback through the resource;
wherein the first random access feedback contains less information than the second random access feedback, and rapid transmission of the first random access feedback is earlier than transmission of the second random access feedback.

13. The base station as claimed in claim 12, wherein the one or more processors are further configured to:
scramble the first random access feedback through a random access radio network temporary identifier (RA-RNTI), wherein the RA-RNTI is determined by a resource of transmitting the random access preamble.

14. The base station as claimed in claim 12, wherein the one or more processors are further configured to:
fill a preset value at a bit after a plurality of pieces of indication information in response that a bit length of the plurality of pieces of indication information is less than a preset length, so that a bit length of the first random access feedback after filling is equal to the preset length, wherein the first random access feedback comprises the plurality of pieces of indication information corresponding to random access preambles transmitted by a plurality of terminals.

\* \* \* \* \*